United States Patent
El-Hassan et al.

(10) Patent No.: US 9,178,629 B2
(45) Date of Patent: Nov. 3, 2015

(54) NON-SYNCHRONIZED RADIO-FREQUENCY TESTING

(75) Inventors: Wassim El-Hassan, San Jose, CA (US); Vishwanath Venkataraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1105 days.

(21) Appl. No.: 13/218,027

(22) Filed: Aug. 25, 2011

(65) Prior Publication Data

US 2013/0049786 A1 Feb. 28, 2013

(51) Int. Cl.
| | | |
|---|---|---|
| H04B 17/00 | (2015.01) | |
| H04B 17/309 | (2015.01) | |
| H04B 17/318 | (2015.01) | |
| H04B 17/327 | (2015.01) | |
| H04B 17/336 | (2015.01) | |

(52) U.S. Cl.
CPC .......... *H04B 17/0085* (2013.01); *H04B 17/309* (2015.01); *H04B 17/318* (2015.01); *H04B 17/327* (2015.01); *H04B 17/336* (2015.01)

(58) Field of Classification Search
CPC ..... H04W 24/00; H04W 56/00; H04W 48/08; H04W 4/06; H04W 52/0216; H04W 52/50; H04W 72/0446; H04W 8/005; H04W 24/08; H04L 43/50; H04L 12/2697; H04L 41/22; H04L 43/18; H04L 65/80; H04L 1/243; H04L 43/0847; H04L 43/106; H04L 12/24
See application file for complete search history.

(56) References Cited

U.S. PATENT DOCUMENTS

| | | | |
|---|---|---|---|
| 6,807,644 B2 | 10/2004 | Reis et al. | |
| 2004/0082297 A1 | 4/2004 | Stambaugh et al. | |
| 2006/0009160 A1* | 1/2006 | Craig | ................... 455/67.11 |
| 2006/0040654 A1 | 2/2006 | Moore et al. | |
| 2006/0229018 A1 | 10/2006 | Mlinarsky et al. | |
| 2009/0124250 A1* | 5/2009 | Topaltzas et al. | ............. 455/423 |
| 2010/0113011 A1 | 5/2010 | Gregg et al. | |
| 2011/0103235 A1 | 5/2011 | Luong et al. | |
| 2011/0292809 A1* | 12/2011 | Olgaard et al. | ............... 370/241 |

OTHER PUBLICATIONS

Gregg et al., U.S. Appl. No. 13/044,844, filed Mar. 10, 2011.

* cited by examiner

*Primary Examiner* — Golam Sorowar
(74) *Attorney, Agent, or Firm* — Treyz Law Group; Jason Tsai; Joseph F. Guihan

(57) ABSTRACT

A device under test (DUT) may be tested using a test station having a test host, a non-signaling tester, and a test cell. During testing, the DUT may be placed within the test cell, and the DUT may be coupled to the test host and the tester. In one suitable arrangement, the DUT may be loaded with a predetermined test sequence. The predetermined test sequence may configure the DUT to transmit test signals using different network access technologies without synchronizing with the tester. The tester may receive corresponding test signals and perform desired radio-frequency measurements. In another suitable arrangement, the tester may be loaded with the predetermined test sequence. The predetermined test sequence may configure the tester to generate test signals using different network access technologies without establishing a protocol-compliant data link with the DUT. The DUT may receive corresponding test signals and compute receive signal quality.

20 Claims, 6 Drawing Sheets

NON-SYNCHRONIZED RADIO-FREQUENCY TESTING

BACKGROUND

This relates generally to wireless electronic devices and, more particularly, to testing of wireless electronic devices.

Wireless electronic devices typically include transceiver circuitry, antenna circuitry, and other radio-frequency circuitry that provide wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, downlink sensitivity, etc.

The performance of a wireless DUT can be measured using a radio-frequency (RF) test station. A radio-frequency test station typically includes a test host, a tester (i.e., a signal generator), and a test cell. The signal generator is connected to the test host. Connected in this way, the test host configures the signal generator to transmit downlink radio-frequency signals during test operations.

In conventional radio-frequency test arrangements, a wireless DUT having, for example, a cellular telephone transceiver is placed into the test cell. The DUT is connected to the test host via a control cable or a wireless waveguide or antenna system. A protocol-compliant communications link is established between the signal generator and the DUT (i.e., an active telephone call is established between the signal generator and the cellular telephone transceiver). Protocol-compliant testing has a tendency to drop calls between the DUT and tester when the tester output power level falls below the DUT's downlink sensitivity. Reestablishing the protocol-compliant connection in order to complete testing can add significant time and cost to the test process.

It would therefore be desirable to be able to provide ways for performing non-protocol-compliant testing.

SUMMARY

Test stations in a radio-frequency test system can be used to perform radio-frequency testing on wireless devices under test (DUTs). Each test station may include a test host, a tester (e.g., a signal generator and a power meter), and a test cell. The DUT may be placed within the test cell during testing. The operation of the tester and the DUT may be controlled by commands generated by the test host via control cables. Radio-frequency test signals may be conveyed between the tester and the DUT via a radio-frequency cable.

In one suitable embodiment of the present invention, the DUT may be loaded with a predetermined test sequence (or list). The predetermined test sequence may configured the DUT to send radio-frequency test signals using different communications network access technologies to the tester without having to establish a protocol-compliant link and without synchronizing with the tester. For example, the DUT may be configured to output first test signals at various transmit power levels at desired frequencies using a first network access technology (e.g., the DUT may be configured to transmit test signals in the "2G" Global System for Mobile Communications cellular telephone bands) during a first time period, to output second test signals at various transmit power levels at desired frequencies using a second network access technology (e.g., the DUT may be configured to transmit test signals in the "2G" Code Division Multiple Access cellular telephone bands) during a second time period immediately following the first time period, etc. The tester may receive the corresponding test signals and make desired test measurements on the test signals.

In another suitable embodiment of the present invention, the tester may be loaded with a predetermined test sequence (or list). The predetermined test sequence may configured the tester to send radio-frequency test signals using different communications network access technologies to the DUT without having to establish a protocol-compliant link and without synchronizing with the DUT. For example, the tester may be configured to output first test signals at various transmit power levels at desired frequencies using a first network access technology (e.g., the tester may be configured to transmit test signals in the "3G" Universal Mobile Telecommunications System (UMTS) cellular telephone bands) during a first time period, to output second test signals at various transmit power levels at desired frequencies using a second network access technology (e.g., the tester may be configured to transmit test signals in the "3G" Code Division Multiple Access 2000 (CDMA 2000) cellular telephone bands) during a second time period immediately following the first time period, to output third test signals at various transmit power levels at desired frequencies using a third network access technology (e.g., the tester may be configured to transmit test signals in the "4G" Long Term Evolution (LTE) cellular telephone bands) during a third time period immediately following the second time period, etc. The DUT may receive the corresponding test signals and compute desired signal quality measurements.

Further features of the present invention, its nature and various advantages will be more apparent from the accompanying drawings and the following detailed description.

DETAILED DESCRIPTION

Wireless electronic devices include antenna and transceiver circuitry that support wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications circuitry such as wireless local area network (WLAN) circuitry to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
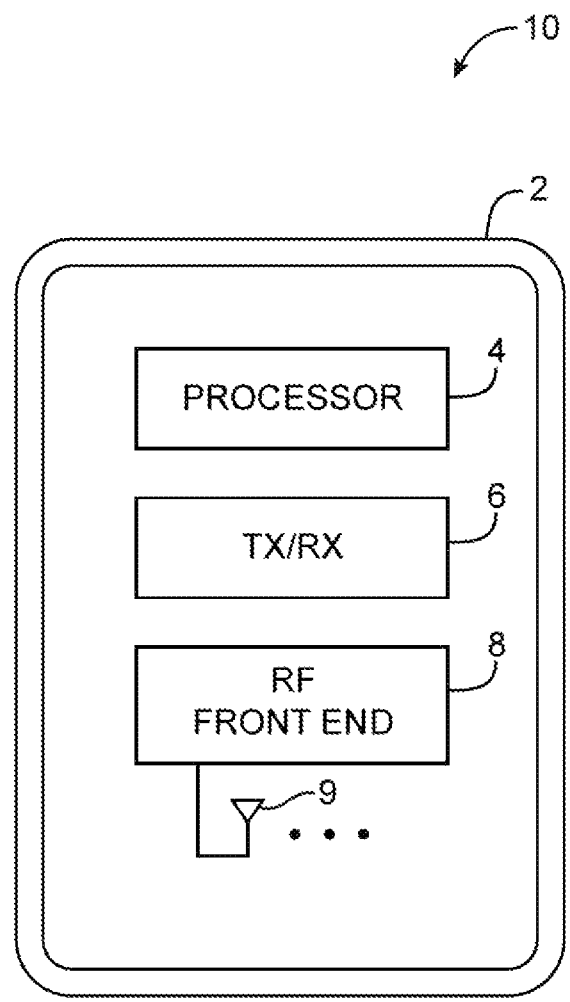
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a cellular telephone, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Storage and processing circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Examples of cellular network access technologies that may be supported by the wireless circuitry of device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular network access technologies may be used if desired. These cellular network access technologies are merely illustrative.

It may be desirable to test the performance of DUT 10 across the different cellular network access technologies. For example, DUT 10 may be configured to transmit/receive radio-frequency test signals in the GSM frequency bands during a first time period, to transmit/receive radio-frequency test signals in the UMTS frequency bands during a second time period, to transmit/receive radio-frequency test signals in the LTE frequency bands during a third time period, etc. Radio-frequency metrics that are measured across the different cellular telephone standards and frequency bands may include receive power level, power spectral density, error vector magnitude, dynamic range, and other radio-frequency performance metrics.

Figure 2:
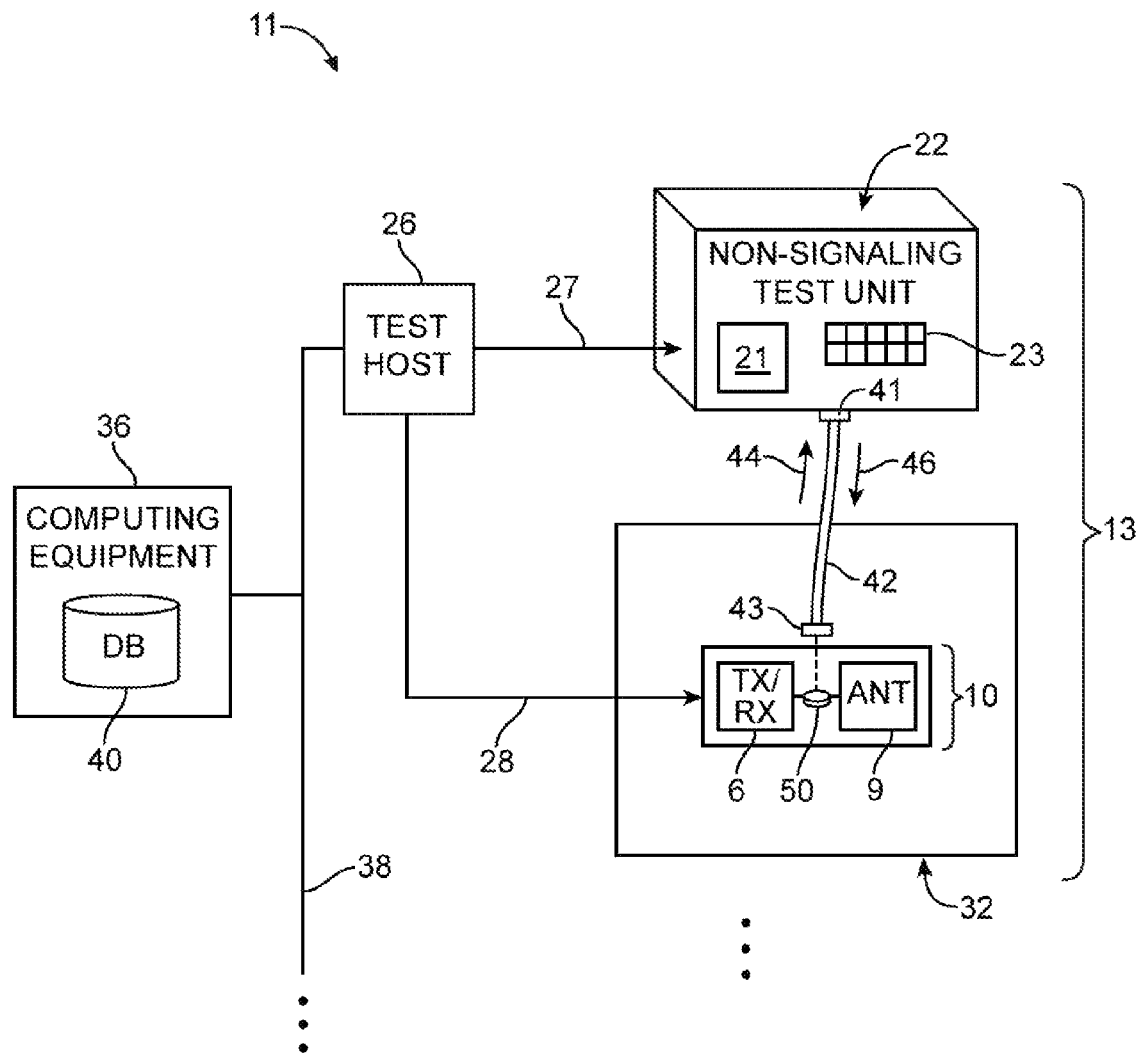
FIG. 2 is a diagram of an illustrative test station that includes a test host, a test unit, and a test cell in accordance with an embodiment of the present invention.

DUT 10 may be tested in a test system such as test system 11 of FIG. 2. Test system 11 may include test accessories, computers, network equipment, tester control boxes, cabling, test cells, and other test equipment for conveying radio-frequency test signals and gathering test results. Test system 11 may include multiple test stations such as test stations 13. There may, for example, be 80 test stations 13 at a given test site. Test system 11 may include any desired number of test stations to achieve desired test throughput.

Each test station 13 may include a test host such as test host 26, a test unit such as test unit 22, and a test cell such as test cell 32. Test host 26 may, for example, be a personal computer or other types of computing equipment.

Test unit (sometimes referred to as a tester) 22 may be a radio communications tester of the type that is sometimes referred to as a call box or a radio communications tester. Test unit 22 need not be capable of supporting protocol-compliant testing (e.g., test unit 22 may lack a full Internet Protocol (IP) stack implementation) and may sometimes be referred to as a non-signaling test unit. Test unit 22 may, for example, be the CMU200 or CMW500 Universal Radio Communication Tester available from Rohde & Schwarz. Test unit 22 may be used to perform radio-frequency non-signaling tests for a variety of different wireless network access technologies in different radio-frequency communications bands and channels.

Test unit 22 may be operated directly or via computer control (e.g., when test unit 22 receives commands from test host 26). When operated directly, a user may control test unit 22 by supplying commands directly to the test unit using the user input interface of the test unit. For example, a user may press buttons in a control panel 23 on the test unit while viewing information that is displayed on a display 21 in the test unit. In computer controlled configurations, a test host such as computer 26 (e.g., software running autonomously or semi-autonomously on the computer) may communicate with the test unit (e.g., by sending and receiving data over a wired path 27 or a wireless path between the computer and the test unit).

Test cell 32 may have a cubic structure (six planar walls), a rectangular prism-like structure (six rectangular walls), a pyramid structure (four triangular walls with a rectangular base), or other suitable structures. Test cell 32 may, for example, be a pyramidal-shaped transverse electromagnetic (TEM) cell that serves to isolate DUT 10 from external sources of radiation, interference, and noise so that DUT 10 is being tested in a controlled environment.

DUT 10 may be coupled to test host 26 through wired path 28 (as an example). Connected in this way, test host 26 may send commands over bus 28 to configure DUT 10 to perform desired operations during testing. Test host 26 and DUT 10 may be connected using a Universal Serial Bus (USB) cable, a Universal Asynchronous Receiver/Transmitter (UART) cable, or other types of cabling (e.g., bus 28 may be a USB-based connection, a UART-based connection, or other types of connections).

DUT 10 may be coupled to test unit 22 though a radio-frequency cable such as radio-frequency cable 42. DUT 10 may include a radio-frequency switch connector 50 interposed in a transmission line path connecting transceiver 6 to antenna 9. Test cable 42 may have a first terminal 41 that is connected to a corresponding port in test unit 22 and a second terminal 43 that can be connected to switch connector 50. When cable 42 is coupled to DUT 10 via switch connector 50, test unit 22 may be configured to perform transceiver testing (e.g., radio-frequency test signals may be conveyed between test unit 22 and transceiver 6) or antenna testing (e.g., radio-frequency test signals may be conveyed between test unit 22 and antenna 9). Cable 42 may include a miniature coaxial cable with a diameter of less than 2 mm (e.g., 0.81 mm, 1.13 mm, 1.32 mm, 1.37 mm, etc.), a standard coaxial cable with a diameter of about 2-5 mm, and/or other types of radio-frequency cabling.

Radio-frequency signals may be transmitted in a downlink direction (as indicated by arrow 46) from tester 22 to DUT 10 through cable 42. During downlink signal transmission, test host 26 may direct test unit 22 to generate RF test signals at its input/output (I/O) port while DUT 10 may receive corresponding test signals through switch connector 50. Radio-frequency signals may also be transmitted in an uplink direction (as indicated by arrow 44) from DUT 10 to tester 22 through cable 42. During uplink signal transmission, DUT 10 may be configured to generate RF signals using transceiver 6 while test unit 22 may receive the corresponding test signals through its I/O port and may perform desired radio-frequency measurements on the received test signals.

As shown in FIG. 2, each test station 13 may be connected to computing equipment 36 through line 38. Computing equipment 36 may include storage equipment on which a database 40 is stored. Test measurements obtained using test unit 22 and test data calculated using DUT 10 may be retrieved by test host 26 to be stored in database 40. The test setup of FIG. 2 is merely illustrative and is not intended to limit the scope of the present invention. If desired, non-signaling test unit 22 may include more than one port, each of which is coupled to a corresponding DUT 10 in a respective test cell 32.

Figure 3:
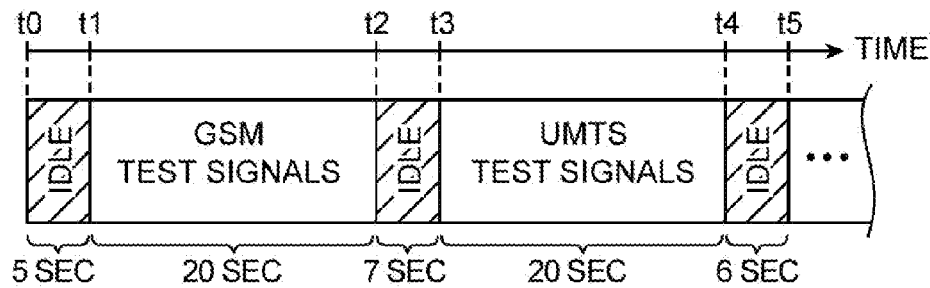
FIG. 3 is a timing diagram showing testing of different cellular network access technologies based on conventional test methods.

FIG. 3 is a timing diagram showing a conventional test method for testing a device under test operating at different cellular network access technologies. From time t0 to t1 (e.g., for 5 seconds), a signaling tester (i.e., a test unit that includes a full Internet Protocol stack implementation) may perform initialization operations with a DUT (i.e., the DUT may be waiting for a GSM pilot signal from the tester for synchronization). At time t1, the DUT may be synchronized to the tester. From t1 to t2 (for 20 seconds), the tester may broadcast test signals in the GSM frequency bands. At time t2, the tester may stop broadcasting test signals and the DUT may be desynchronized from the tester.

From time t2 to t3 (for 7 seconds), the signaling tester performs initialization operations with the DUT (i.e., to synchronize with DUT by broadcasting UMTS pilot signals). From t3 to t4 (for 20 seconds), the tester may broadcast test signals in the UMTS frequency bands. At time t4, the tester may stop broadcasting test signals to desynchronize the DUT from the tester.

As shown in the example of FIG. 3, the idle times during which the DUT and the tester attempt to synchronize with each other may vary and add significant time to the testing process. Moreover, if the DUT fails to receive the pilot (initialization) signal from the tester, test operations will enter fail mode and testing will not be able to proceed properly without test operator intervention.

Figure 4:
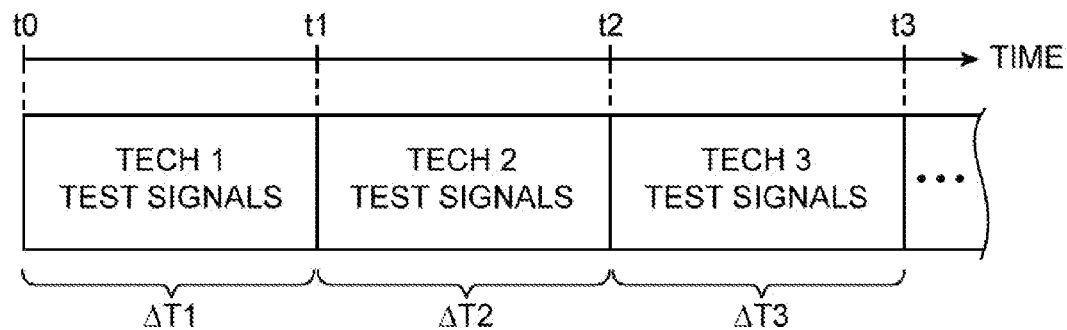
FIG. 4 is a timing diagram illustrating testing of different network access technologies in accordance with an embodiment of the present invention.

FIG. 4 is a timing diagram illustrating a test procedure that does not require DUT 10 to be synchronized with test unit 22, thereby eliminating the idle time periods during which DUT 10 has to wait for initialization signals from the test unit and substantially reducing test time and the probability of a test failure.

In one suitable arrangement of the present invention, DUT 10 may be configured to transmit test signals of a first type during a first time period $\Delta T1$ (e.g., radio-frequency test signals using network access technology TECH1), to transmit test signals of a second type during a second time period $\Delta T2$ (e.g., radio-frequency test signals using network access technology TECH2), to transmit test signals of a third type during a third time period $\Delta T3$ (e.g., radio-frequency test signals using network access technology TECH3), etc. For example, DUT 10 may be configured to output test signals in the GSM frequency bands during the first time period (from t0 to t1), test signals in the CDMA frequency bands during the second time period (from t1 to t2), test signals in the UMTS (also known as wideband-CDMA) frequency bands during the third time period (from t2 to t3), test signals in the LTE frequency bands during the fourth time period, etc. While DUT 10 is transmitting the test signals in the respective frequency bands, test unit 22 may receive the corresponding test signals and performed the desired RF measurements.

In another suitable arrangement of the present invention, test unit 22 may be configured to transmit test signals using TECH1 during first time period $\Delta T1$, to transmit test signals using TECH2 during second time period $\Delta T2$, to transmit test signals using TECH3 during third time period $\Delta T3$, etc. For example, test unit 22 may be configured to generate test signals in the CDMA frequency bands during the first time period, test signals in the GSM frequency bands during the second time period, test signals in the UMTS frequency bands during the third time period (from t2 to t3), test signals in the EVDO frequency bands during the fourth time period, etc. While test unit 22 is generating the test signals in the respective frequency bands, DUT 10 may receive the corresponding test signals and compute desired RF performance metrics that reflect the quality of received signals. Examples of signal quality measurements that may be made in DUT 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc.

In general, the different time periods (e.g., ΔT1, ΔT2, ΔT3, etc.) may be equal or different in duration and any desired network communications technology or standards may be tested during each of the respective time periods.

Figure 5:
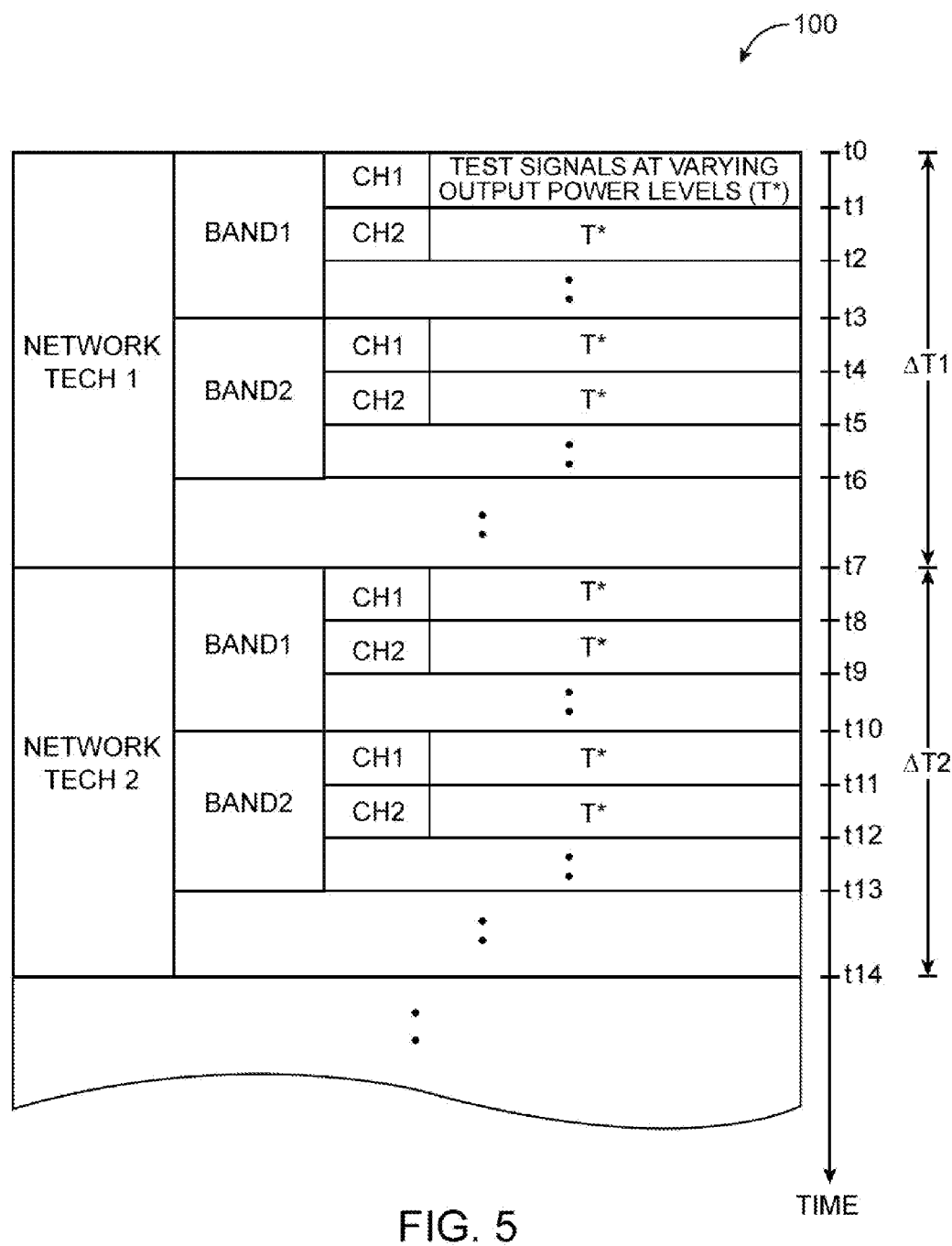
FIG. 5 is a diagram of an illustrative predetermined test sequence in accordance with an embodiment of the present invention.

At least one of DUT 10 and test unit 22 may be loaded with a predetermined test sequence 100 (sometimes referred to as a master sequence list of network access technologies and frequencies to be tested). As shown in FIG. 5, test sequence 100 may be a table or other types of data structures that contain information identifying an order in which to use each of a plurality of network access technologies to test DUT 10.

For example, consider a scenario in which DUT 10 is loaded with a test operating system configured to direct DUT 10 output RF test signals based on sequence 100. During first time period ΔT1, for example, DUT 10 may transmit test signals (T*) at varying output power levels in channel 1 of band 1 associated with a first type of network access technology TECH1 (from time t0 to t1), in channel 2 of band 1 associated with TECH1 (from time t1 to t2), in other channels of band 1 associated with TECH1 (from time t2 to t3), in channel 1 of band 2 associated with TECH1 (from time t3 to t4), in channel 2 of band 2 associated with TECH1 (from time t4 to t5), in other channels of band 2 associated with TECH1 (from time t5 to t6), and in other bands associated of TECH1 (from time t6 to t7).

During second time period ΔT2, DUT 10 may be configured to transmit test signals T* at varying output power levels in channel 1 of band 1 associated with a second type of network access technology TECH2 (from time t7 to t8), in channel 2 of band 1 associated with TECH2 (from time t8 to t9), in other channels of band 1 associated with TECH2 (from time t9 to t10), in channel 1 of band 2 associated with TECH2 (from time t10 to t11), in channel 2 of band 2 associated with TECH1 (from time t11 to t12), in other channels of band 2 associated with TECH2 (from time t12 to t13), and in other bands associated of TECH2 (from time t13 to t14). During testing of each channel, radio-frequency test signals T* may be stepped up or stepped down in power level to test for uplink sensitivity (e.g., the minimum output power level of DUT 10 for which test unit 22 can still receive corresponding test signals properly) or downlink sensitivity (e.g., the minimum output power level of test unit 22 for which DUT 10 can still receive corresponding test signals properly).

Sequence 100 may specify the test time allocated for each channel. For example, test unit 22 may be configured to generate test signals T* for 0.5 seconds in each channel associated with TECH1, for 0.55 seconds in each channel associated with TECH2, or for any desired duration. As a result, the total test time for iterating through sequence 100 is known and predictable. List 100 may include the desired test sequence for testing the performance of DUT 10 across any number of network access technologies and standards. If desired, predetermined test sequence 100 may be loaded into test unit 22 so that test unit 22 generates test signals based on the order specified in sequence 100.

Figure 6:
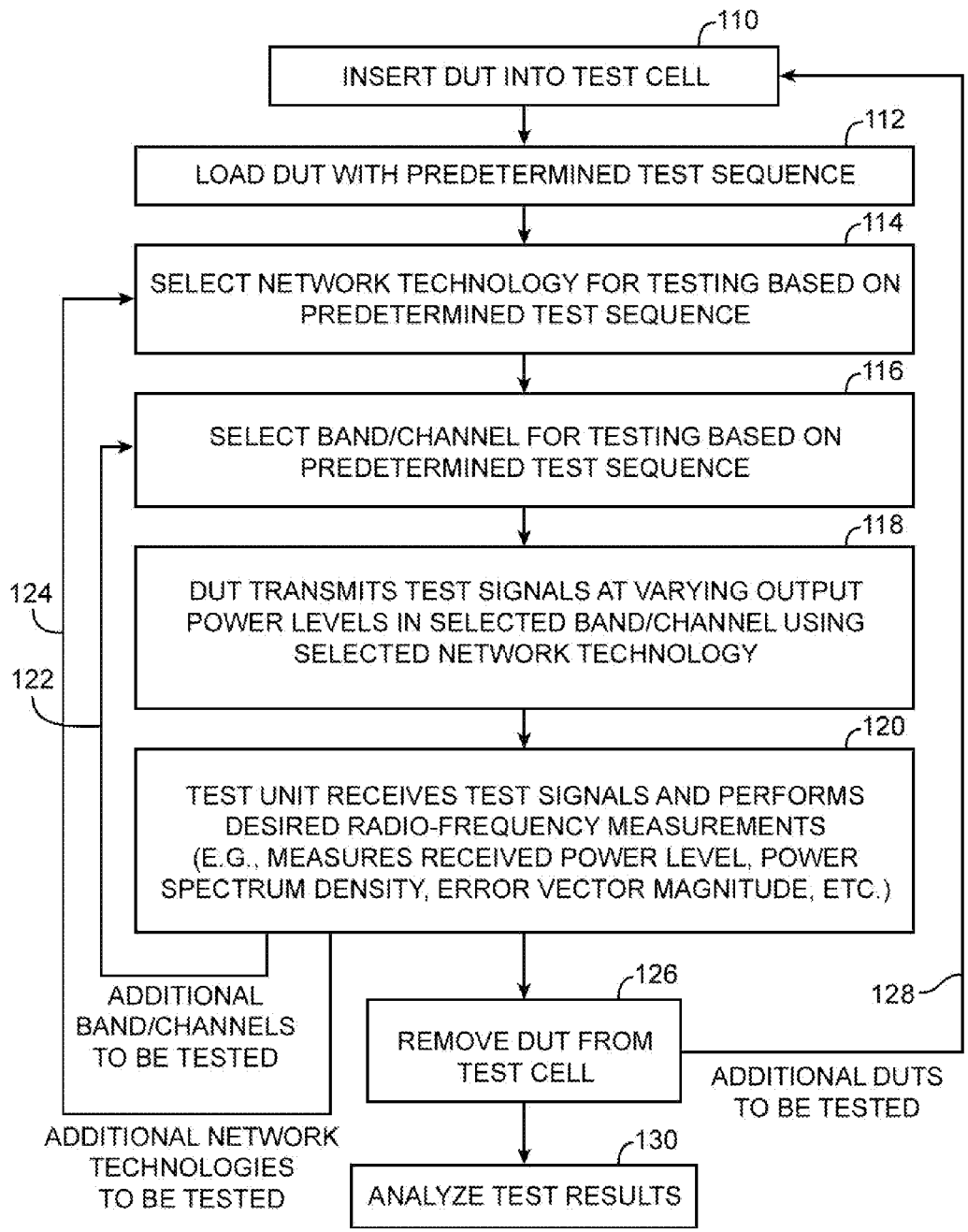
FIGS. 6 and 7 are flow charts of illustrative steps involved in testing wireless electronic devices using a predetermined test sequence of the type shown in FIG. 5 in accordance with an embodiment of the present invention.

FIG. 6 is a flow chart of illustrative steps involved configuring DUT 10 to transmit RF test signals during non-signaling test operations. At step 110, DUT 10 may be placed into test cell 32. At step 112, DUT 10 may be loaded with predetermined test sequence 100. If desired, test unit 22 may also be loaded with sequence 100 so that test unit 22 can anticipate the order and type of test signals it should be expecting during testing. At step 114, DUT 10 may select a first network access technology for testing based on an initial entry in test sequence 100. At step 116, DUT 10 may select a first band/channel to be tested based on the initial entry in test sequence 100. At step 118, DUT 10 may then transmit test signals at varying output power levels (T*) in the selected band/channel associated with the selected network access technology.

At step 120, test unit 22 may receive corresponding test signals and perform desired radio-frequency measurements (e.g., measure receive power level, power spectral density, error vector magnitude, signal-to-noise radio, adjacent channel leakage ratio, frequency response, and other radio-frequency metrics). Processing may loop back to step 116 to test additional channels in the selected band or to test additional bands associated with the selected network access technology, as indicated by path 122. Processing may loop back to step 114 to test additional network access technologies, as indicated by path 124.

Upon testing the final entry in test sequence 100, DUT 10 may be removed from test cell 32 (step 126). Operations may loop back to step 110 to test additional DUTs, as indicated by path 128. At step 130, test data gathered using test unit 22 may be stored locally at test host 26 or stored centrally in database 40. The test data for each DUT may then be analyzed to determine whether each DUT 10 satisfies design criteria (e.g., pass/fail criteria may be applied to each DUT to determine whether each DUT is to be marked as a passing DUT or a failing DUT).

Figure 7:
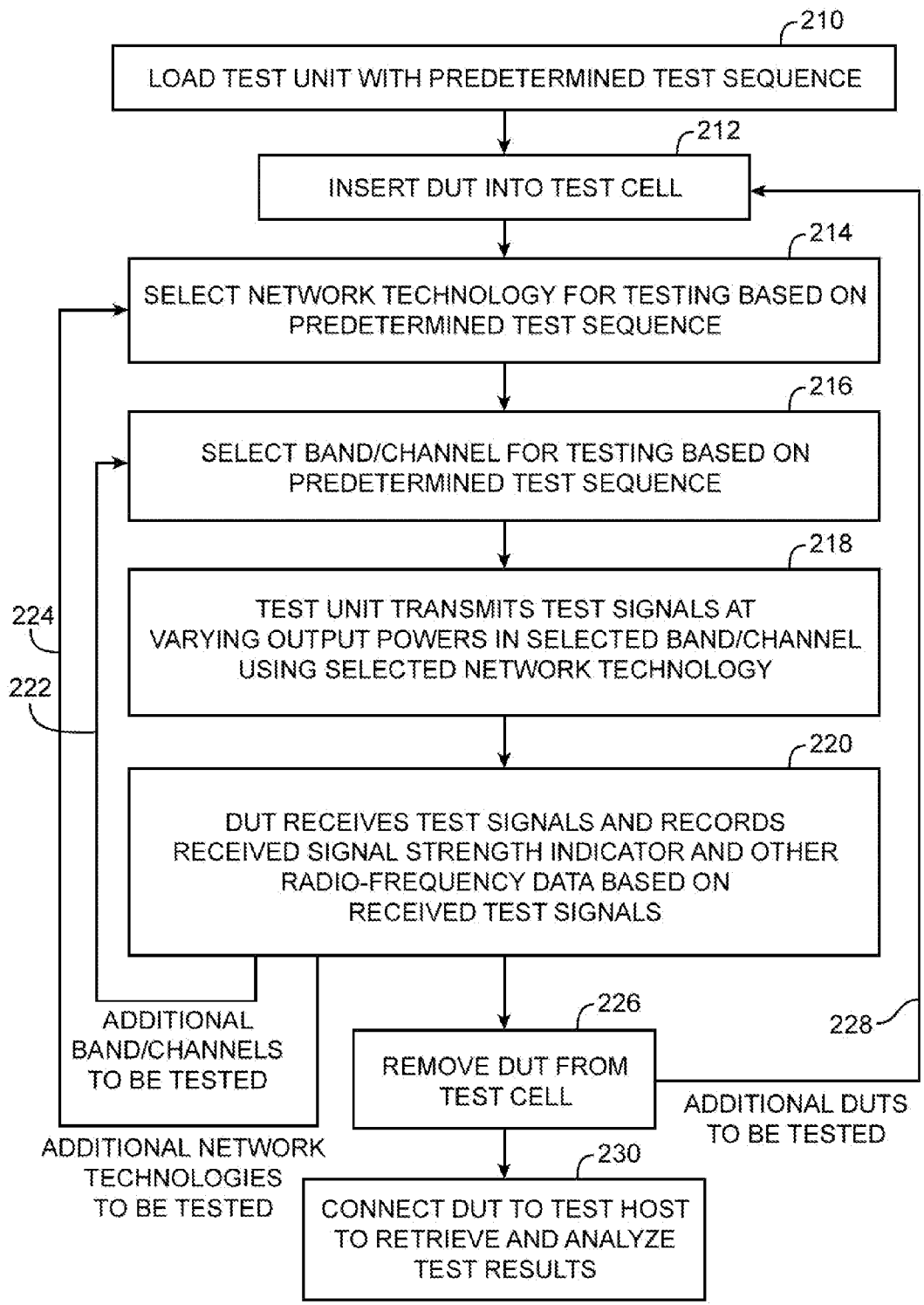

FIG. 7 is a flow chart of illustrative steps involved configuring test unit 22 to transmit RF test signals during non-signaling test operations. At step 210, DUT 10 may be placed into test cell 32. At step 212, test unit 22 may be loaded with predetermined test sequence 100. If desired, DUT 10 may also be loaded with sequence 100 so that device 10 can anticipate the order and type of test signals it should be expecting during testing. At step 214, test unit 22 may select a first network access technology for testing based on an initial entry in test sequence 100. At step 216, test unit 22 may select a first band/channel to be tested based on the initial entry in test sequence 100. At step 218, test unit 22 may then transmit test signals at varying output power levels (T*) in the selected band/channel associated with the selected network access technology.

At step 220, DUT 10 may receive corresponding test signals and compute a receive signal strength indicator (RSSI) and other desired RF performance metrics (e.g., RSCP measurements, SINR and SNR measurements, Ec/Io or Ec/No measurements, etc.). DUT 10 may record the computed RSSI internally on its storage circuitry. Processing may loop back to step 216 to test additional channels in the selected band or to test additional bands associated with the selected network access technology, as indicated by path 222. Processing may loop back to step 214 to test additional network access technologies, as indicated by path 224.

Upon testing the final entry in test sequence 100, DUT 10 may be removed from test cell 32 (step 226). Operations may loop back to step 212 to test additional DUTs, as indicated by path 228. At step 230, RSSI and other test data stored in each DUT 10 may be retrieved by plugging DUT 10 into test host 26. Test data gathered using this approach may be stored locally at test host 26 or stored centrally in database 40. The test data for each DUT may then be analyzed to determine whether each DUT 10 satisfies design criteria.

FIGS. 4-7 described herein are merely illustrative and are not intended to limit the scope of the present invention. Non-signaling testing based on a predetermined test sequence (or list) is not limited to testing the performance of DUT 10 across different cellular network access technologies but can be extended to be used for testing the performance of DUT 10 across different WLAN protocols and different modulations schemes.

Consider, for example, a scenario in which at least one of DUT 10 and test unit 22 is loaded with a predetermined test sequence 100 specifying a list of IEEE 802.11 protocols to be tested. In this example, list 100 may specify the order for transmitting test signals using different modulation schemes/data rates associated with IEEE 802.11a during first time period ΔT1 (e.g., to transmit test signals at data rates of 6, 9, 12, 18, 24, 36, 48, and 54 Mbps), the order for transmitting test signals using different modulation schemes/data rates associated with IEEE 802.11b during second time period ΔT2 (e.g., to transmit test signals at data rates of 5.5 and 11 Mbps), etc.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of testing a device under test with a test station, the method comprising:
   loading at least one of the device under test and the test station with information identifying an order in which to use each of a plurality of network access technologies to test the device under test with the test station; and
   using the test station, performing tests on the device under test by conveying radio-frequency test signals of a first type between the device under test and the test station based on the information for a first time period and subsequently conveying radio-frequency test signals of a second type that is different than the first type between the device under test and the test station based on the information for a second time period immediately following the first time period without synchronizing the device under test to the test station.

2. The method defined in claim 1 wherein the test station comprises a test cell, and wherein performing the tests on the device under test comprises performing the tests on the device under test while the device under test is placed in the test cell.

3. The method defined in claim 2 wherein the test station further comprises a test unit coupled to the device under test via a radio-frequency cable, and wherein performing the tests on the device under test comprises generating radio-frequency test signals using each of the plurality of network access technologies with the test unit.

4. The method defined in claim 3 further comprising:
   using the device under test, receiving corresponding test signals from the test unit.

5. The method defined in claim 4 wherein performing the tests further comprises:
   using the device under test, computing receive signal quality information on the received test signals by obtaining information selected from the group consisting of: received signal strength indicator information, received signal code power information, signal-to-interference ratio, and signal-to-noise ratio information.

6. The method defined in claim 5, wherein the test station further comprises a test host coupled to the test unit, the method further comprising:
   using the test host, retrieving the receive signal quality information from the device under test.

7. The method defined in claim 2 wherein performing the tests on the device under test comprises outputting radio-frequency test signals using each of the plurality of network access technologies with the device under test.

8. The method defined in claim 7, wherein the test station further comprises a test unit, the method further comprising:
   using the test unit, receiving corresponding test signals from the device under test.

9. The method defined in claim 8 wherein performing the tests comprises:
   using the test unit, performing radio-frequency test measurements on the received test signals by making at least one measurement selected from the group consisting of: receive signal power, power spectral density, dynamic range, adjacent channel leakage ratio, and error vector magnitude.

10. The method defined in claim 2, wherein the plurality of network access technologies comprises a plurality of cellular network access technologies.

11. The method defined in claim 1, wherein loading at least one of the device under test and the test station with information identifying the order in which to use each of the plurality of network access technologies to test the device under test with the test station comprises loading the test station with information identifying the order in which to use each of the plurality of network access technologies to test the device under test with the test station.

12. The method defined in claim 1, wherein loading at least one of the device under test and the test station with information identifying the order in which to use each of the plurality of network access technologies to test the device under test with the test station comprises loading the device under test with information identifying the order in which to use each of the plurality of network access technologies to test the device under test with the test station.

13. The method defined in claim 1, wherein there is no idle time period between the first and second time periods.

14. The method defined in claim 1, wherein the first type of radio-frequency test signals are associated with a first network access technology, and wherein the second type of radio-frequency test signals are associated with a second network access technology that is different than the first network access technology.

15. A method of testing a device under test with a test station, the method comprising:
   loading at least one of the device under test and the test station with information identifying an order in which to use each of a plurality of network access technologies to test the device under test with the test station; and
   using the test station, performing tests on the device under test by conveying radio-frequency test signals between the device under test and the test station based on the information without synchronizing the device under test to the test station, wherein performing the tests on the device under test comprises performing the tests on the device under test while the device under test is placed in a transverse electromagnetic cell that isolates the device under test from external interference, wherein the test station further comprises a test unit coupled to the device under test via a radio-frequency cable.

16. The method defined in claim 15, wherein the test unit is positioned outside of the transverse electromagnetic cell during testing.

17. The method defined in claim 16, wherein performing the tests on the device under test comprises generating first radio-frequency test signals using a first of the plurality of network access technologies for a first time period and generating second radio-frequency test signals using a second of the plurality of network access technologies for a second time period.

18. The method defined in claim 17, wherein the second time period immediately follows the first time period.

19. A method of testing a device under test with a test station, the method comprising:

loading at least one of the device under test and the test station with information identifying an order in which to use each of a plurality of network access technologies to test the device under test with the test station; and using the test station, performing tests on the device under test by conveying radio-frequency test signals between the device under test and the test station based on the information without synchronizing the device under test to the test station, wherein performing the tests on the device under test comprises generating first radio-frequency test signals using a first of the plurality of network access technologies for a first time period and generating second radio-frequency test signals using a second of the plurality of network access technologies for a second time period.

20. The method defined in claim 19, wherein the second time period immediately follows the first time period.

* * * * *